United States Patent [19]

Wilje

[11] 4,408,142

[45] Oct. 4, 1983

[54] DEVICE FOR THE CONTROL OF THE LUMINOUS FLUX FROM A MAIN BEAM BULB IN A MOTOR VEHICLE

[76] Inventor: Sven O. E. Wilje, Sagvägen 1, 791 00 Falun, Sweden

[21] Appl. No.: 265,401

[22] Filed: May 20, 1981

[51] Int. Cl.³ .............................................. B60Q 1/02
[52] U.S. Cl. ........................................ 315/82; 315/83; 315/130; 315/313; 315/294; 315/360; 307/10 LS
[58] Field of Search ....................... 315/82, 83, 90, 93, 315/130, 194, 195, 313, 314, 291, 360; 328/140, 155; 307/10 LS, 141.4

[56] References Cited

U.S. PATENT DOCUMENTS 3,784,874  1/1974  Barrett et al. ................... 315/314 X Primary Examiner—Eugene La Roche
Assistant Examiner—Vincent De Luca
Attorney, Agent, or Firm—Burns, Doane, Swecker & Mathis

[57] ABSTRACT

A device for causing the luminous flux from a main beam bulb (8) to fall gradually when the headlights are switched to dipped beam. The current to the dipped beam bulb is made to control a control circuit (6) which will gradually reduce the current supply to the main beam bulb (8). The control circuit incorporates an oscillator (65) which causes a counting chain (66a-66d) to advance. This activates a diode matrix (68) which is arranged so as to control the main beam bulb (8) via a shift register (69). The positioning of the diodes in the diode matrix will determine the shape of the dimming curve for the luminous flux.

8 Claims, 4 Drawing Figures

DEVICE FOR THE CONTROL OF THE LUMINOUS FLUX FROM A MAIN BEAM BULB IN A MOTOR VEHICLE

TECHNICAL FIELD

The present invention is in respect of a device for the control of the luminous flux from a main beam bulb in a motor vehicle. The invention relates in particular to the control of the luminous flux in conjunction with the activation of the switching signal between main beam and dipped beam, i.e. when the headlights are to be switched from main beam to dipped beam. The invention is based on the observation that the luminous flux from the main beam bulb is to be so arranged that it will fall gradually after the switching signal has been activated.

DESCRIPTION OF THE PRIOR ART

Various devices are already known for the control of the luminous flux from a main beam bulb in a motor vehicle by the activation of the switching signal from main beam to dipped beam and in which the luminous flux from the main beam bulb shall be so arranged that it will fall gradually after switching. An example of such a device is that described in U.S. Pat. No. 4,105,927.

DESCRIPTION OF THE PRESENT INVENTION

TECHNICAL PROBLEM

It is already an accepted fact that when two motor vehicles approach one another on a road when it is dark, then it is usual for the drivers to activate a switch so that the luminous flux emitted by the headlight bulb on main beam will instead be emitted by the headlight bulb on dipped beam. This is done in order to prevent dazzle.

This switching from the bright main beam bulb to the less intensive dipped beam bulb usually occurs immediately, but the eyes are not capable of adjusting to this rapid change. The main beam bulb is also known to cast a beam pattern along the road which is specifically different to that produced by the dipped beam bulb.

These two factors affect the driver in such a way that he is usually unable for a number of seconds to appreciate the events and situations which arise on the road ahead of the vehicle.

As a means of preventing this, the U.S. Pat. No. 4,105,927 referred to above suggests that the transition from main beam to dipped beam should be made to occur more gently, thereby causing the beam pattern along the road to change gradually rather than suddenly. The intention of this is to permit the eyes to adjust to the change, thereby improving the possibility of appreciating the situations which arise on the road both before and during the time when the vehicles pass each other.

The American Patent referred to above also describes ways in which the luminous flux from the mainbeam bulb may be caused to vary so that during an initial period there will be an immediate reduction in the luminous flux from the main beam bulb until this reaches a predetermined level, after which the luminous flux will change gradually for the remainder of the total period of change.

The device specified in the American Patent referred to above also illustrates how a transistor may be connected in series with the bulb, through which the flow of current is controlled by a second transistor of the appropriate capacitance and with a variable resistance.

The development work which was conducted has revealed that the device specified in the American Patent referred to above is not satisfactory and that it does not meet all the requirements which may be placed on such a device; it is for this reason that the present invention is intended to describe an alternative means of controlling the luminous flux from the main beam bulb by the use of digital techniques, which provides the possibility of much more simple control together with the opportunity for additional applications.

Experience gained from the practical use of a device of the type described in the American Patent indicates that the device must be such that it will be switched in automatically as soon as the change is made from main beam to dipped beam, on condition that the main beam bulb must have been connected and in use for a certain period of time of approximately 3 seconds before switching will occur.

There is in fact a requirement to be able to give optical signals, which is done with short flashes of the headlights using the main beam bulb, and this facility must remain available independently of the device suggested here.

The device shall also be capable of being switched out directly in the event of an unexpected meeting between vehicles, which in the case of the present invention is possible by rapidly switching in the main beam for a second time, i.e. dimming will then take place twice.

SOLUTION

Thus the present invention is in respect of a device for the control of the luminous flux from a main beam bulb in a motor vehicle in conjunction with the activation of a switching signal between main beam and dipped beam, in which the luminous flux from the main beam bulb is so arranged that it will fall gradually after switching.

The present invention describes the method whereby the switching signal is fed to a modulator so arranged that with the aid of an oscillator a counter is advanced, which is so arranged that via a decoder it will cause the current to the main beam bulb to reduce in accordance with a pre-determined pattern or programme.

The invention describes the method whereby the modulator incorporates an oscillator connected to the counter, in which the counter is connected via a decoder to a diode matrix, which, via a shift register and an exciter controls the current to the main beam bulb via a transistor.

The counter shall be zeroed by the activation of a signal to switch in the dipped beam. The zeroing of the counter takes place during a pre-determined time delay, which may, for instance, last for three seconds from the moment at which the switching signal from dipped beam to main beam is activated. Activation of the switching signal will bring into play a delay circuit of which the output signal is active during the pre-determined delay. The oscillator signal is made to affect the counter by activating the dipped beam switching-in signal, and the counter is so arranged that it will activate the contents of a diode matrix, which is distributed in series with an exciter, thereby providing power for the main beam bulb.

The voltage drop is reduced by a transistor connected in series with the main beam bulb, but the counter advances through the diode matrix and supplies the main beam bulb with power which reduces with time by switching in different combinations of diodes in the diode matrix.

It is possible to programme a pre-determined dimming curve by changing the positions of the diodes in the diode matrix.

ADVANTAGES

The advantages associated with a device in accordance with the present invention are that the component parts are simple and are above all capable of being positioned on a printed circuit board, in addition to the fact that the device offers certain advantages over previous technology. It is thus possible for the device to be switched out for a short period after activation via the switching signal for the main beam.

What may be regarded as the most characteristic features of a device in accordance with the present invention are indicated in Patent claim 1 below.

DESCRIPTION OF THE DRAWINGS

A suggested provisional design illustrating the significant characteristics of the present invention is described in greater detail in relation to the attached drawing, in which.

DESCRIPTION OF THE PREFERRED EMBODIMENT

Figure 1:
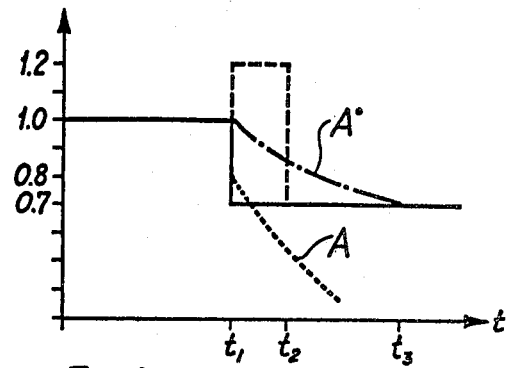
FIG. 1 is a time graph of the luminous flux in various types of existing device.

With reference to FIG. 1, the solid line shows how the luminous flux directed at the surface of the road ahead of a vehicle which is being driven in the dark will vary in relation to the elapsed time when the headlights are switched from main beam to dipped beam.

The value of the main beam will most frequently be 1.0 and at the point in time t1 switching to dipped beam takes place in such a way that the main beam bulb is extinguished at the same time as the dipped beam bulb is lit, with the result that the luminous flux is reduced immediately to a value of 0.7. The value of 0.7 remains constant after the time t1.

Systems are also available which will also switch in the dipped beam bulb when the headlights are dipped, which are shown with a dotted line; this system will, at the moment of switching, at the point in time t1, cause the luminous flux to increase to a value of 1.2, but will also cause the light value to fall momentarily to a value of 0.7 at the point in time t2 as the main beam bulb is extinguished momentarily.

It is suggested in the American Patent referred to above that the luminous flux from the main beam bulb should fall immediately to a value of 0.8 at the moment of switching at the point in time t1, after which it should fall in line with the dotted curve "A" for a period of time until the time value t3 is reached, at which point the luminous flux is produced only by the dipped beam bulb at a value of 0.7.

The present invention belongs to that category of devices in which the transition from main beam to dipped beam takes place gradually in accordance with curve "A".

Figure 2:
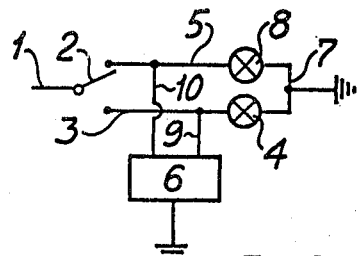
FIG. 2 shows the principal connections for a device in accordance with the present invention.

FIG. 2 shows a basic device in which reference 1 indicates the feeder cable to a selector switch 2. The selector switch 2 may on the one hand be located so that it will supply current via a cable 3 to a bulb 4 referred to as the dipped beam bulb. On the other hand, the selector switch 2 may be located so that it will supply current along a cable 5 to a bulb 8 referred to as the main beam bulb. The device 6 is operated via a feeder cable 9 connected to the cable 3 and controls to the main beam bulb 8 by means of the signal which is to be found in the cable 10. The bulbs 4 and 8 are connected to an earth potential via a cable 7.

It should be noted at this point that after the selector switch 2 is switched from cable 5 to cable 3, current is supplied to cable 5 via the device 6 in a manner which shall be described in greater detail.

The present design example will now be described in greater detail with reference to FIG. 3.

Figure 3:
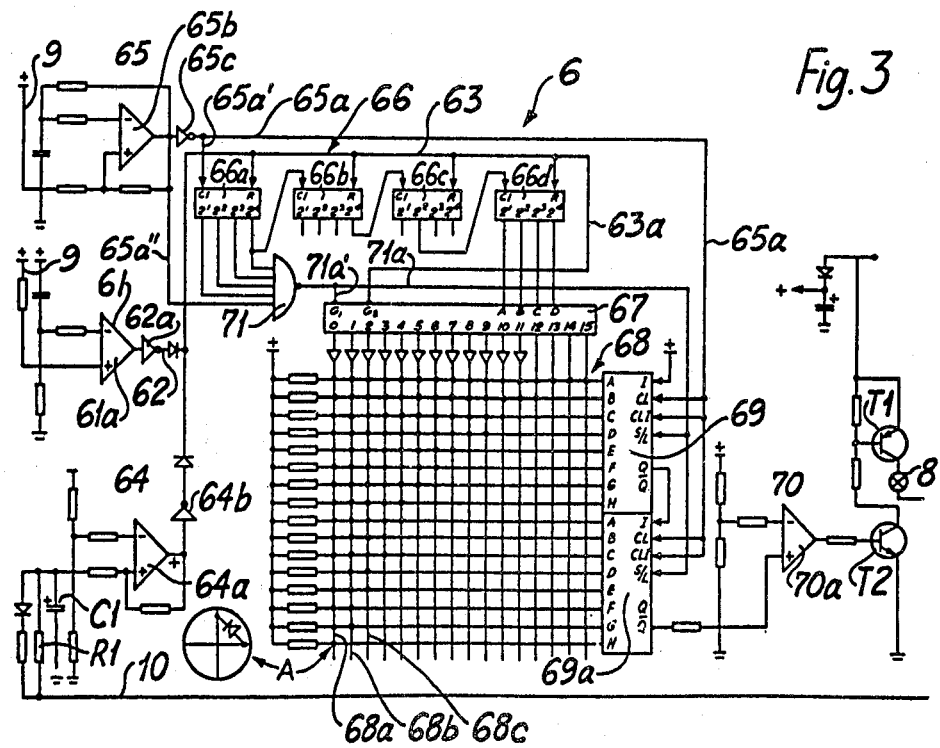
FIG. 3 shows a connection diagram for a device in accordance with the present invention.

Thus FIG. 3 shows a connection diagram for a device for the control of the luminous flux from a main beam bulb 8 in a motor vehicle by the activation of the switching signal from main beam to dipped beam and in which the luminous flux from the main beam bulb 8 is so arranged that it will fall gradually after switching. If a signal is present in cable 3, i.e. when the dipped beam bulb 4 is activated, a circuit 61 will be activated via cable 9 which will produce an output signal (peak signal) in a cable 62. This signal in cable 62 will zero a counting chain 66 via a cable 63.

The activation of a main beam bulb 8 by feeding current into the cable 5 will at the same time activate a delay circuit 64 which will inhibit any possible effect of the circuit 61 for a pre-determined period.

This time delay will depend on the value of the condenser C1 and the resistance R1.

The condenser C1 will be charged for the entire period for which a main beam signal is present.

The switching signal is fed into a modulator which is so arranged that with the help of an oscillator 65 it will advance the counter 66, consisting of four counters identified as 66a-66d. These counters may be in the form of a circuit identified as 4520.

The counter 66 is so arranged that via a decoder 67 it will generate counting pulses to control the main beam bulb 8 in such a way that it will cause its light intensity to reduce in accordance with a pre-determined pattern or programme. The decoder may consist of a circuit with the identification 74C154.

The modulator incorporates said oscillator 65, which is connected to the counter 66, which in turn is connected via the decoder 67 to a diode matrix 68. This diode matrix 68 is connected via a shift register 69 to an exciter 70, which via a transistor T2 controls the current to the main beam bulb 8 via a further transistor T1. The shift register 69 consists of two circuits with the identification 74C165.

The counter 66 is zeroed immediately by the activation of a signal via cable 9 to switch in the dipped beam bulb, which will also start up the oscillator 65.

The counter is zeroed for a pre-determined time delay of roughly three seconds, depending on the condenser C1 and on the resistance R1, before the switching signal is activated. Activation of the switching signal will bring into play a delay circuit 64, of which the output signal is active during the pre-determined delay.

The oscillator signal in the cable 65 is made to affect the counter by activating the dipped beam switching-in signal, whereupon the counter will activate the contents of the diode matrix which will be distributed by the exciter 70, thereby providing power for the main beam bulb 8.

The counter advances through the diode matrix which supplies the main beam bulb with power which reduces with time, and a pre-determined dimming curve is programmed in according to the positioning of the diodes in the diode matrix.

The oscillator 65 transmits its clock pulses partly via a cable 65a' in order to advance the counter 66a–66d, and partly via a cable 65a in order to cause the shift register 69, 69a to distribute the contents of the diode matrix 68.

The clock pulses are also connected via a cable 65a" to one of the inputs of a NAND gate 71, which may consist of a circuit with the identification 74C30, in which the four remaining inputs are connected to the outputs of the counter 66a.

The output of the NAND gate is connected via a cable 71a to the shift register 69, 69a and via a cable 71a' to the decoder 67.

A pulse generated in the circuit 61 will pass along cable 63 and will zero all the counters 66a–66d, and will also pass along the cable 63a and will zero the decoder 67.

The oscillator 65 will now generate clock pulses which will advance the counter 66a–66d, and when a signal is present in all the outputs of the counter 66a a pulse will be transmitted to the next counter 66b as well as a pulse being fed into the cable 71a in order to activate the shift register 69, 69a.

The pulse in the cable 71a' will activate the first row 68a in the diode matrix 68. The following pulse in the cable 71a' will activate the second row 68b, and so on.

The first row 68a contains sixteen diodes and the second row 68b contains fifteen diodes, and so on, with a reducing number of diodes at the points of intersection. The diodes are shown as heavy dots in the Figure.

The amplifiers 61a, 64a, 65b and 70a consist of a circuit with the identification LM2900, whilst the inverters 62a, 64b, 65c consist of a circuit with the identification 74C04.

When the counters 66a–66d are re-set, then the code "0000" will appear at their outputs at the same time as the outputs of the decoder 67 will be at "0". Thus the output O will be low in value. This output is connected to all the rows in the diode matrix which are consequently low in value, and the input signals to the shift register all have the value 0.

The oscillator, which started up at the same time as the dipped beam was switched-in, will now advance the counter 66a by 1.6 kc. After sixteen pulses, the requirement of the 5-input NAND gate 71 will have been satisfied and its output will fall to a low value; the contents of the first column 68a in the diode matrix 68 will then be charged and transferred in parallel to the shift register 69. During the following sixteen clock pulses, the contents of the register will be distributed in series via the exciter 70. Since the register is charged with "0" and the signals are taken out via the inverted output, this will produce a series of sixteen positive pulses, and the main beam bulb 8 will be lit for 16/16ths of 10 ms. This procedure will be repeated 63 times and the main beam bulb will be supplied with full power for 0.63 seconds (but with a couple of volts lost as a voltage drop across the transistor T1).

The third counting stage will be activated after 16×63 clock pulses, and the decoder 67 will have a one at the A input. This will cause the second column 68b to be activated, and the contents of the register will be changed to thirteen zeros and three ones: this will cause the power supplied to the bulb during the following 0.63 seconds to be reduced to 13/16ths, then to 11/16ths, and so on, until the entire matrix has been advanced, which takes about 10 seconds. Once the third stage has finished counting, the counter will be activated in such a way that it will cease to advance. The dimming cycle will then be complete and the main beam bulb will be totally extinguished.

The delay circuit 64 will then zero the counter and will hold it in the "0" position until the main beam bulb is once again lit via the main beam selector switch 2.

As has already been mentioned, the delay signal from the delay circuit 64 shall cease once the main beam has been lit and remains lit for at least three seconds; the circuit is then clear for re-activation when dimming occurs, i.e. when an activation signal is present in cable 9.

The dimming curve is programmed-in by the diodes in the diode matrix. Full power will be produced from a column which is full of diodes, and 5 diodes will give 5/16ths of full power, and so on.

Figure 4:
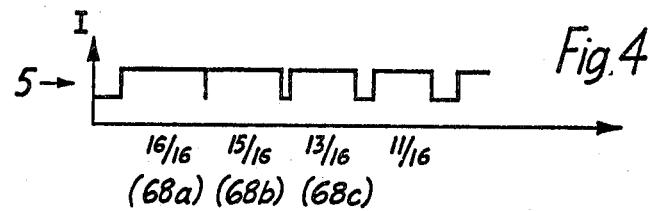
FIG. 4 shows the form of the voltage pulses to the main beam bulb.

FIG. 4 shows an example of the output signal which is fed to the main beam bulb 8.

It should be noted at this point that the dipped beam bulb is lit and heats up the main beam bulb, which reduces the risk of the bulbs having a shorter service life.

This invention is not, of course, restricted to the above design, which is given by way of an example, but may be subjected to modifications within the scope of the following Patent Claim.

I claim:

1. A circuit providing a gradual decrease in the luminous flux emitted by a main beam headlamp in a motor vehicle upon the generation of a switching signal indicating a changeover from main beam to dimmed beam, comprising:
    an oscillator for generating output pulses;
    a counter for counting said output pulses upon the occurrence of said switching signal;
    means responsive to said counter for producing a headlamp control signal that varies over time to represent a gradual decrease in luminous flux according to a predetermined pattern; and
    an exciter responsive to said headlamp control signal for reducing the current in the main beam headlamp in accordance with said pattern.

2. The circuit of claim 1 wherein said control signal producing means comprises a decoder producing output signals related to the contents of said counter, a diode matrix for receiving said output signals and producing corresponding information signals, and a shift register for receiving said information signals and generating said headlamp control signal.

3. The circuit of claim 1 further including means for resetting said counter to zero upon the generation of said switching signal.

4. The circuit of claim 1 further including means responsive to a signal indicating changeover from dimmed beam to main beam for maintaining said counter in a reset state for a predetermined time period.

5. The circuit of claim 4 wherein said reset maintaining means includes a delay circuit that is activated by said changeover signal to generate a reset signal for said predetermined time period.

6. The circuit of claim 1, wherein said oscillator is activated by said switching signal to generate said output pulses.

7. The circuit of claim 1 wherein said exciter includes a transistor connected in series with the main beam headlamp.

8. The circuit of claim 2 wherein the position of diodes in said diode matrix determines said predetermined pattern.

* * * * *